United States Patent [19]

Haas

[11] 4,225,455
[45] Sep. 30, 1980

[54] PROCESS FOR DECOMPOSING NITRATES IN AQUEOUS SOLUTION

[75] Inventor: Paul A. Haas, Knoxville, Tenn.

[73] Assignee: The United States of America as represented by the United States Department of Energy, Washington, D.C.

[21] Appl. No.: 50,380

[22] Filed: Jun. 20, 1979

[51] Int. Cl.² .................. C01G 56/00; C01B 21/22
[52] U.S. Cl. .................. 252/301.1 R; 423/11; 423/250; 423/251; 423/260; 423/261; 423/351; 423/400
[58] Field of Search ............. 252/301.1 R, 301.1 W; 423/11, 19, 250, 251, 260, 261, 351, 400

[56] References Cited
U.S. PATENT DOCUMENTS

| | | | |
|---|---|---|---|
| 3,008,904 | 11/1961 | Johnson, Jr. et al. | 252/301.1 W |
| 3,158,577 | 11/1964 | Bray et al. | 252/301.1 W |
| 3,673,086 | 6/1972 | Drobnik | 252/301.1 W |
| 3,725,293 | 4/1973 | Haas | 252/301.1 R |
| 3,801,701 | 4/1974 | Robins et al. | 423/261 |
| 3,862,296 | 1/1975 | Dotson et al. | 252/301.1 W |
| 3,962,114 | 6/1976 | Berreth | 252/301.1 W |

*Primary Examiner*—Deborah L. Kyle
*Attorney, Agent, or Firm*—R. V. Lupo; Stephen D. Hamel

[57] ABSTRACT

This invention is a process for decomposing ammonium nitrate and/or selected metal nitrates in an aqueous solution at an elevated temperature and pressure. Where the compound to be decomposed is a metal nitrate (e.g., a nuclear-fuel metal nitrate), a hydroxylated organic reducing agent therefor is provided in the solution. In accordance with the invention, an effective proportion of both nitromethane and nitric acid is incorporated in the solution to accelerate decomposition of the ammonium nitrate and/or selected metal nitrate. As a result, decomposition can be effected at significantly lower temperatures and pressures, permitting the use of system components composed of off-the-shelf materials, such as stainless steel, rather than more costly materials of construction. Preferably, the process is conducted on a continuous basis. Fluid can be automatically vented from the reaction zone as required to maintain the operating temperature at a moderate value—e.g., at a value in the range of from about 130°–200° C.

10 Claims, 4 Drawing Figures

PROCESS FOR DECOMPOSING NITRATES IN AQUEOUS SOLUTION

The invention is a result of a contract with the U.S. Department of Energy.

BACKGROUND OF THE INVENTION

This invention relates generally to processes for the decomposition of nitrates in solution. More particularly, it relates to a single-step process for the pressurized decomposition of ammonium nitrate and/or selected metal nitrates in aqueous solution.

Various industrial processes generate aqueous waste solutions of ammonium nitrate which pose problems with respect to release to the environment. For example, various chemical processes for the treatment or production of nuclear-reactor fuels generate such waste solutions, these solutions often containing radioactive solutes such as impurities or incompletely recovered compounds of nuclear-fuel metals (uranium, thorium, plutonium).

Preferably, the ammonium nitrate in such solutions would be decomposed to form environmentally acceptable waste products, any radioactive impurities or valuable fuel-metal compounds being recycled for recovery. However, practical rates of decomposition of ammonium nitrate are very difficult to achieve at atmospheric pressure. Furthermore, the decomposition of ammonium nitrate solutions under pressure has not been attractive hitherto because of the high temperatures and pressures required (e.g., 240° C. and 500 psig) and because of the high corrosivity of the solutions at such temperatures.

Various de-nitration processes are described in U.S. Pat. No. 3,275,293, "Conversion of Fuel-Metal Nitrate Solutions," issued to P. A. Haas on Apr. 3, 1973. The patent describes in detail a single-step process for converting a fuel-metal nitrate to a fuel-metal oxide in pressurized, heated aqueous solution. In that process, a water-soluble nitrate-reducing agent selected from the group consisting of hydrazine and hydroxylated organic compounds consisting of a carbon, hydrogen, and oxygen is incorporated in the solution to be treated. The resulting solution is maintained at an elevated temperature and pressure to (a) decompose the nitrate to volatile products and (b) precipitate the fuel metal as fuel-metal oxide. A pressure-relief valve vents gases from the reaction zone whenever the operating pressure exceeds a preselected value corresponding to a preselected operating temperature. The oxide precipitate is recovered and dried to provide a powder which may be pelletized for use as a nuclear fuel.

Unfortunately, the above-described patented process is subject to certain limitations. Hydrazine is perhaps the most generally suitable reducing agent for use therein, but hydrazine generates some ammonium-nitrate waste, which is undesirable in many applications. On the other hand, hydroxylated organic reducing agents—e.g., methyl alcohol—do not give complete and reproducible reactions at temperatures below about 200° C. At such temperatures, the process solutions are so corrosive that the reactor and various other system components need be composed of costly special materials rather than off-the-shelf materials.

The following United States patents relating to removal or decomposition of nitrates in solution have been noted: U.S. Pat. No. 3,008,904, "Processing Radioactive Waste," Dec. 29, 1959; U.S. Pat. No. 3,158,577, "Method of Treating Radioactive Waste," Nov. 24, 1964; U.S. Pat. No. 3,673,086, "Method of Removing Nitric Acid, Nitrate Ions, and Nitrite Ions Out of Aqueous Waste Solutions," June 27, 1972; U.S. Pat. No. 3,862,296, "Conversion Process for Waste Nitrogen-Containing Compounds," Jan. 21, 1975; and U.S. Pat. No. 3,962,114, "Method for Solidifying Liquid Radioactive Wastes," June 8, 1976. These patents contain no teaching or suggestion relating to the decomposition of nitrates in aqueous solutions also containing nitric acid, and nitromethane.

OBJECTS OF THE INVENTION

Accordingly, it is an object of this invention to provide a novel process for decomposing ammonium nitrate and/or selected metal nitrates in aqueous solution.

It is another object to provide such a nitrate-decomposition process characterized by a reduced temperature threshold for the decomposition reaction.

It is another object to provide a process wherein the nitrate-decomposition is effected in a single step in a pressurized reactor operating at relatively low temperatures and pressures.

It is another object to provide a process for effecting such decomposition in apparatus composed of off-the-shelf materials.

It is another object to provide a process for effecting the decomposition of ammonium nitrate in pressurized, heated aqueous solution without generating particulates.

Other objects, advantages, and novel features of the invention will become apparent from the following description of preferred forms of the invention.

SUMMARY OF THE INVENTION

This invention is a process for decomposing ammonium nitrate and/or selected metal nitrates (e.g., nuclear-fuel metal nitrates) in aqueous solution at elevated temperature and pressure. In those applications where the compound to be decomposed is a metal nitrate, a hydroxylated organic reducing agent is provided in the solution. In accordance with the invention, an effective proportion of both nitromethane and nitric acid is incorporated in the solution to accelerate the decomposition of the ammonium nitrate and/or metal nitrate.

DESCRIPTION OF THE PREFERRED EMBODIMENT

Figure 1:
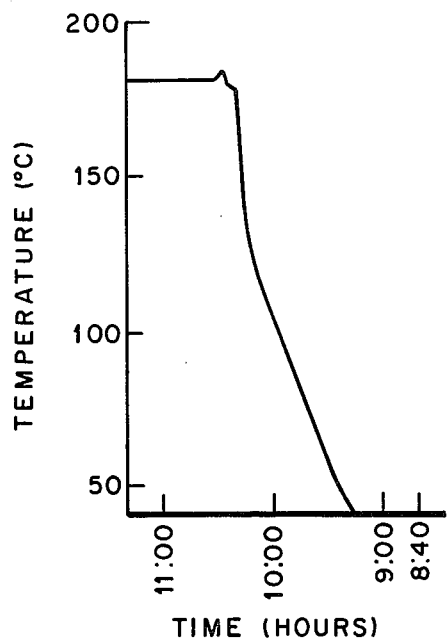
FIG. 1 is a graph correlating a temperature and time for a $NH_4NO_3$-decomposition run conducted in accordance with this invention.

This invention is based on my finding that the decomposition of ammonium nitrate and/or selected metal nitrates in pressurized, heated aqueous solution is accelerated when an effective proportion of both nitromethane ($CH_3NO_2$) and nitric acid ($HNO_3$) is incorporated in the solution. (As used herein to refer to decomposition, the terms "accelerate" and "accelerated" refer to increases in decomposition rate, including increases from a rate of zero.) So far as is known, this is the first time that the decomposition-promoting effect of this combination of agents has been recognized.

An advantage deriving from this discovery is that the decomposition of nitrate in pressurized, aqueous solution can be effected by reduced temperatures and pressures. For instance, the inclusion of an effective proportion of nitromethane ($CH_3NO_2$) provides useful rates of decomposition at temperatures at least 70° C. below those otherwise required. In other words, the nitromethane and nitric acid act in combination to lower the threshold temperature for the decomposition reaction. In some instances, the reduction in operating temperature so achieved makes it possible to reduce the decomposition-zone pressure by as much as 400 psig. Such reductions in pressure and temperature are highly advantageous because, for example, corrosion rates are reduced to the extent that the system for carrying out the decomposition can consist of off-the-shelf stainless-steel components rather than special materials which are more costly and less readily available. Furthermore, the use of moderate temperatures and pressures for the decomposition of $NH_4NO_3$ in the liquid avoids the formation of particulates in the waste gases; such particulates can be a problem in dry, high temperature decompositions.

The mechanism for the enhanced decomposition effected by my improved process is not yet understood. I do not wish to be bound by any theory with regard to the mechanism, but it is possible that the nitromethane (or a decomposition product thereof) initiates chain reactions in which nitric acid is decomposed by reacting with $NH_4^+$ until one of the reactants is reduced to a low concentration.

EXAMPLE 1

The single-step decomposition of $NH_4NO_3$ in aqueous solution under pressure was investigated in a series of batchwise runs conducted in a conventional system including a 14-liter, high-pressure autoclave composed of off-the-shelf (type-347) stainless steel. The autoclave was provided with an electric heater and with instrumentation for continuously recording the autoclave temperature and pressure. The reactants were mixed and charged as an aqueous solution at room temperature (20°–30° C.). The autoclave then was sealed, and argon was added to the air therein to increase the pressure to 50 psig. The initial setting of the heater resulted in a temperature increase of 5/3° C. a minute; when the temperature reached a value about 50° C. below a selected maximum temperature, the heater setting was changed to maintain the autoclave at an essentially constant temperature in the absence of heat generated by reaction. The rate of reaction was calculated by noting the recorded total pressure (PR) in the autoclave and subtracting therefrom the vapor pressure of water [$P(H_2O)$] at the autoclave temperature. The typical run was conducted until the total pressure indicated that the rate of gas production had decreased to a relatively low value. The heat then was shut off and the autoclave permitted to cool to below 50° C., following which the products were removed, separated, and analyzed. No material was introduced or removed in the course of the typical run.

As shown in the Table 1, the typical run was conducted with a 2.0-liter aqueous feed solution containing (a) 6.5 moles of $NH_4NO_3$; (b) 2.0–2.7 moles of $HNO_3$; and (c) one or more additional components, identified in column 1. In Run C2, the feed solution contained no $HNO_3$. The temperature at which the decomposition reaction started was indicated by (a) the increase in the rate of temperature rise displayed by the recorder TR (column 9) and/or (b) the formation of non-condensible gases (column 10).

TABLE 1

PRESSURIZED DECOMPOSITION OF AQUEOUS SOLUTIONS OF $NH_4NO_3$
Charge to autoclave: 2.0 liters of solution containing 6.5 moles $NH_4NO_3$; 2.0–2.7 moles of $HNO_3$; and additional components listed below

| Column: 1 | 2 | 3 | 4 | 5 | 6 | 7 | 8 | 9 | 10 | 11 |
|---|---|---|---|---|---|---|---|---|---|---|
| Additional feed components | | Solution pH | | Product solution | | Gas Formed | | Temperature for start of Reaction (°C.) | | |
| Compound | Moles | Feed | Product | Moles $NH_4^+$ | Moles nitrate and nitrite | Moles total | Maximum rate (moles/min) | From TR[a] | From $PR-P(H_2O)$ | Run No. |
| $NH_4OH$[b] | 2.0 | 9.4 | 8.6 | Unchanged | | 0 | 0 | No reaction to 286° C. | | C2 |
| Ni + Ce + Mn | 0.2 | 8.45 | 0.85 | <0.1 | 1.9 | 8.1 | 2. | 276 | 280 | C4 |
| $NH_4OH$ | 3.0 | | | | | | | | | |
| Ni + Ce + Mn | 0.1 | 0.75 | 0.70 | 3.4 | 6.2 | 3.2 | 0.03 | N.D.[a] | 240 | C7 |
| $CH_3OH$ | 0.3 | | | | | | | | | |
| n-propanol | 1.0 | 0.60 | 0.34 | 1.7 | 3.4 | 6.9 | 0.08 | N.D. | 191 | C13 |
| $CH_3COOH$ | 2.0 | | 0.43 | 2.3 | 4.4 | 6.1 | 0.06 | N.D. | 226 | C14 |
| Methyl alcohol | 2.0 | 0.63 | 0.71 | 2.3 | 4.8 | 6.4 | 0.04 | N.D. | 185 | C17 |
| Ethylene glycol | 1.35 | | 0.84 | 0.8 | 4.2 | 9.1 | 0.14 | N.D. | 192 | C22 |
| Nitrobenzene | 0.2 | | | | | 4.0 | 0.03 | N.D. | 202 | C24 |
| Nitromethane | 2.0 | | 0.77 | <0.01 | 3.61 | 10.6 | 3. | 115. | 115 | C25 |
| Nitromethane | 2.0 | 0.7 | 0.70 | <0.01 | 3.81 | 11.0 | 3. | 114. | 110 | C26 |

[a]N.D. indicates not detectable; that is, change in slope is too small to see.
[b]No $HNO_3$ in feed for Run No. C2

As shown in columns 9 and 10 of Table 1, the decomposition of $NH_4NO_3$ occurred at much lower temperatures in duplicate Runs C25 and C26, the only runs in which the feed solution contained both nitric acid and nitromethane. That is, in these runs the temperature at which the decomposition reaction became rapid was from about 70° to 165° C. below the corresponding temperatures for the other runs. Nitromethane was incorporated in the feed solutions for Runs 25 and 26 only. As mentioned, Run C2 was the only run in which nitric acid was not included in the feed solution.

Figure 2:
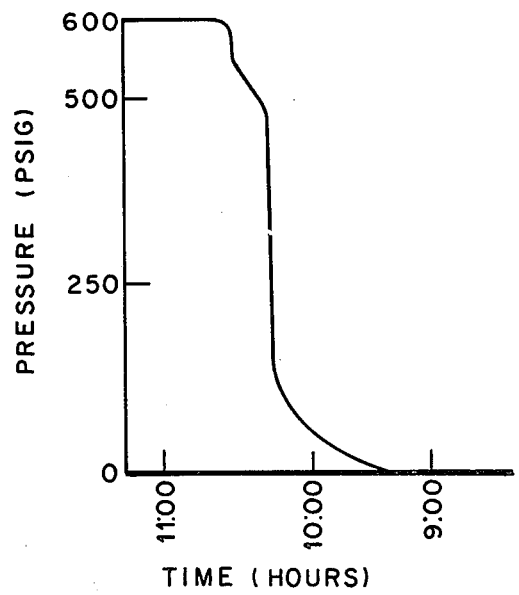
FIG. 2 is a graph correlating pressure and time for the same run.

FIGS. 1 and 2 show, respectively, the temperature-time and pressure-time displays obtained in Run C25. The displays for Run C26 were essentially identical. Referring to the other runs, when the nitromethane was replaced by methyl alcohol, ethylene glycol, n-propanol, acetic acid, or nitrobenzene, the reactions were not detectable until much higher temperatures (185° to 226° C.) were reached; furthermore, the reaction rates (column 8) were much lower, being in the range of from about 1/20 to 1/100 of those obtained in Runs C25 and C26. When the feed solution included Ni, Ce, and Mn as nitrate salts (Run C7), a temperature of 240° C. was required to initiate reaction; a temperature of 280° C. was required for a solution containing these salts and made basic by the addition of $NH_4OH$ (Run C4). A $NH_4NO_3$-$NH_4OH$ solution (Run C2) did not show detectable decomposition at temperatures up to 286° C.

Referring to column 5 of the table, analyses of the product solutions for Runs C25 and C26 showed less than 0.01 mole $NH_4^+$, indicating nearly complete decomposition of the $NH_4NO_3$. These runs (conducted in accordance with the invention) were the only ones characterized by the desirable combination of low operating temperature and high degree of decomposition. Referring to column 6, the analytical procedure used gave the amounts of nitrite and nitrate together; the amounts for Runs C25 and C26 were confirmed by the total amount of free acid. The pH value given in column 4 indicated mostly nitrous acid, since nitric acid would be highly ionized and have a much lower pH. Analyses of gas samples from Runs C25 and C26 showed the formation of 6.6 moles of $N_2$ and 1.92 moles of $CO_2+CO$ in Run C25; the corresponding amounts for Run C26 were 6.9 moles and 1.95 moles. These represent approximate material balances for the carbon from the nitromethane and for the nitrogen from decomposed $NH_4^+$ and $NO_3$. Analyses for $O_2$ and Ar showed good agreement with the initial gas charge to the autoclave. The waste streams for Runs 25 and 26 were free of particulates.

Referring to FIG. 1, in Runs 25 and 26 the reactor temperature ultimately reached about 180° C. However, the rate of $NH_4NO_3$ decomposition was relatively high over a range of more moderate temperatures where the vapor pressure of water was comparatively low. For instance, as shown by the slope of the curve in FIG. 1 the rate of decomposition was relatively high in the range from about 130° to 170° C., corresponding to relatively low vapor pressures of water of from about 40 to 100 psia. Thus, a continuous reactor provided with pressure-controlled letdown of gases may be used to maintain the operating temperature at moderate values in the range of from 130°–200° C., yet provide a relatively high rate of decomposition. In such an arrangement, the heat of reaction can be removed conveniently by the vaporization of water. The pH of the solution in the reactor is maintained in the acidic range.

The decomposition of $NH_4NO_3$ on a continuous basis may be conducted in a system designed with (a) pressure-controlled letdown of the gases generated in the reactor and (b) recycle of concentrated $NH_4NO_3$ to the reactor. That is, the reactor is provided with a pressure-relief valve for venting gas and liquid therefrom whenever the reactor pressure exceeds the value corresponding to the desired operating temperature. Heat of reaction is removed by the vaporization of water from the solution in the reactor. The effluent from the reactor may be processed, as by distillation, to provide concentrated $NH_4NO_3$ solution for recycle, for higher decomposition efficiency.

Figure 3:
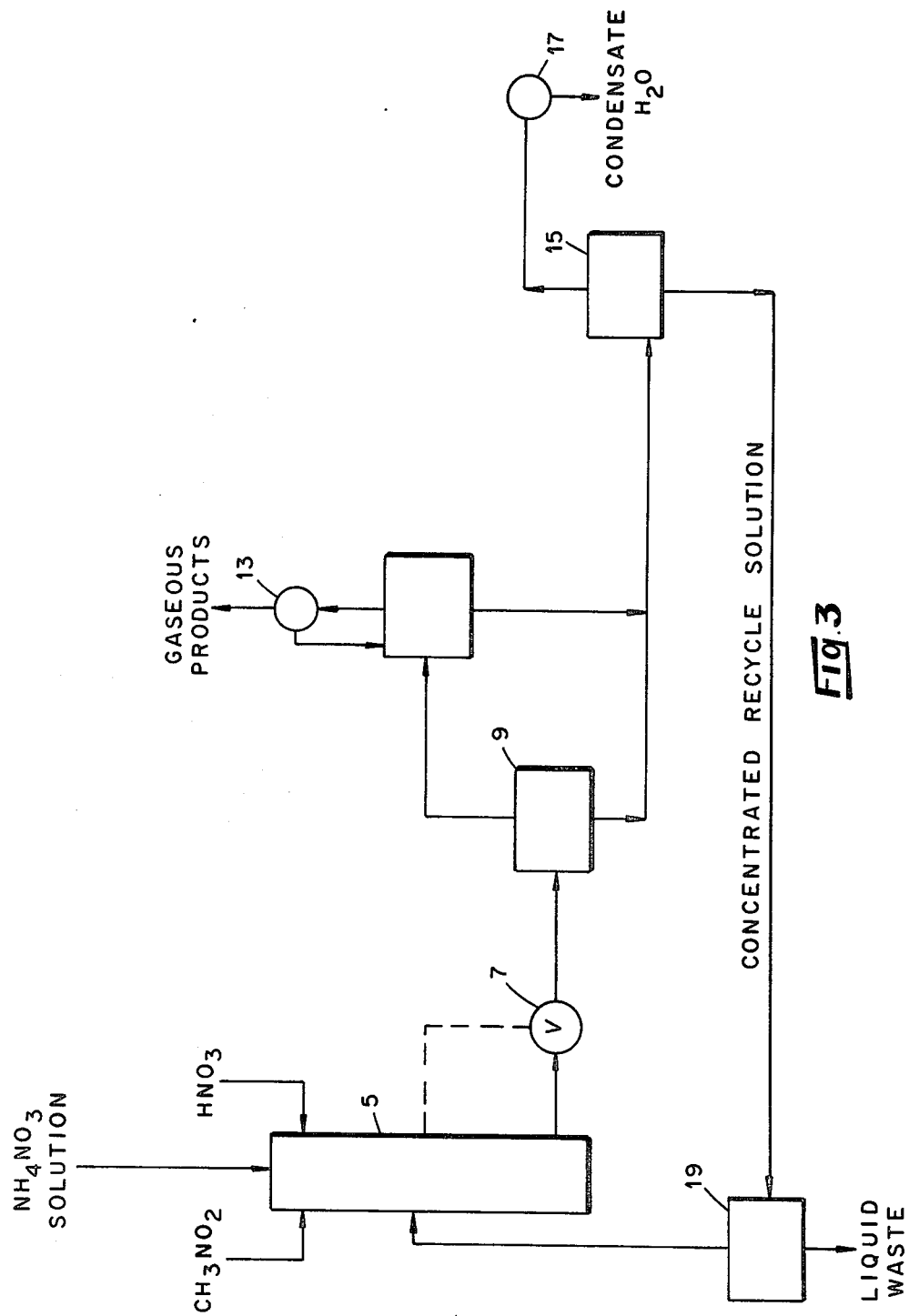
FIG. 3 is a schematic diagram of a system for continuously decomposing $NH_4NO_3$ in aqueous solution, in accordance with the invention.

FIG. 3 illustrates one form of continuous system of the kind just described. The system may consist of conventional components composed of commercially available materials, such as type-347 stainless steel. The system includes an electrically heated high-pressure reactor 5, which is provided with outlets for separately introducing streams of $CH_4NO_2$; $HNO_3$; an aqueous $NH_4NO_3$ feed solution which may contain impurities (e.g., uranium and thorium); and a concentrated aqueous recycle solution. As described, the $CH_3NO_2$ and $HNO_3$ are provided to effect decomposition of the $NH_4NO_3$ at comparatively low temperatures. The reactor 5 is provided with a pressure-relief valve 7 for venting therefrom a mixture of gas and liquid as required to maintain a reactor pressure of, say 200 psig, and thus a moderate operating temperature of, say, 160° C. Operation at that temperature provides a relatively high $NH_4NO_3$ decomposition rate while permitting the use of off-the-shelf materials of construction.

The mixture of gas and liquid from the vent valve 7 is directed into any suitable phase separator 9, the gaseous output therefrom being fed into any suitable scrubber 11. The upflow from the scrubber is passed through a reflux condenser 13, providing a vent stream of gaseous products including $CO_2$, $N_2$, and some nitrogen oxides. The liquid output from the scrubber is combined with that from the phase separator 9, and the resulting stream is fed to any suitable distillation means 15. Water vapor from the still is passed through a condenser 17, providing a stream of condensate water. The liquid output from the still is relatively rich in nitrate and impurities and is recycled to the reactor 5. If desired, all or part of the recycle stream may be fed to an ion-exchange column 19 or other suitable means for removing impurities (e.g., uranium and thorium) and discharging them as a waste stream. The purified stream from 19 is fed to the reactor. Preferably, the operating pressure for the reactor is set at a value which is sufficiently high to avoid the necessity of heating the reactor after decomposition has been initiated. In accordance with standard engineering practice, the feed streams to the reactor may be pre-heated, if desired.

This invention also is effective in accelerating the decomposition, in pressurized and heated aqueous solution, of nitrates of metals which are weak bases. For instance, the following example illustrates how the invention can be used to advantage in the process of aforementioned U.S. Pat. No. 3,725,293—that is, in the conversion of a fuel-metal nitrate to particulate fuel-metal oxide in a pressurized and heated aqueous solution containing a hydroxylated organic reducing agent. In this particular example, the reducing agent is methyl alcohol ($CH_3OH$), and the fuel-metal nitrate is $UO_2(NO_3)_2$. The exemplary solution also contains ammonium nitrate, which is not essential to the conversion of the fuel-metal nitrate, but which sometimes is present in fuel-metal nitrate solutions generated in nuclear-fuel processes.

EXAMPLE 2

The conversion of a fuel-metal nitrate [$UO_2(NO_3)_2$] to particulate fuel-metal oxide ($UO_X$) was investigated in a series of runs conducted in the autoclave referred to in Example 1. The autoclave was pressurized, heated, and operated essentially as described in that example.

As shown in Table 2, the typical run was conducted with a 2.0-liter aqueous feed solution containing (a) 1.0 mole of uranyl nitrate [$UO_2(NO_3)_2$]; (b) 2.0–2.5 moles of NH$_4$NO$_3$; (c) 0.5–1.0 mole of HNO$_3$; and additional components as shown in columns 1 and 2. The temperature at which reaction started was determined from (a) the change in the slope of the temperature-recorder trace (column 10) and/or (b) the formation of non-condensible gases (column 11).

As shown in columns 9–11 of Table 2, Run C27 (the only run conducted with both nitromethane and nitric acid) was characterized by the lowest amount of uranium in the product solution (column 5) and thus the highest degree of uranium precipitation. Furthermore, Run C27 was characterized by the highest reaction rate (column 9) and, along with Run C11, the lowest threshold temperature. The temperature and pressure displays for Run C27 closely approximated those shown in FIGS. 1 and 2 with respect to values and curve shape. Referring to column 7 (Run C27), nearly complete decomposition of the nitrates in the solution was achieved.

The metal can be hydrolyzed or precipitated as indicated in the following equation for uranium:

$$UO_2^{2+} + 2OH^- \rightarrow UO_3 \cdot H_2O$$

Referring to the invention more generally, it is applicable to the decomposition of nitrates of those metals which hydrolyze or precipitate to remove OH$^-$ from solution; as a result, the solution remains acidic and the decomposition of nitrate continues at a useful rate. Metals which are relatively strong bases (Na, K, Mg, Ca, Sr, etc.) do not precipitate. In such instances, the metal nitrate solutions would become basic, and the decomposition of nitrate would be much slower. Uranium, thorium, and plutonium are examples of weak bases which hydrolyze or precipitate at low pH's for temperatures in the range of from about 130° to 200° C.

Referring to Runs C11 and C12, Table 2, the use of n-propanol as the reducing agent resulted in low reac-

TABLE 2

PRESSURIZED AQUEOUS REDUCTION FOR CONVERSION OF URANYL NITRATE TO UO$_X$
Charge: 2.0 liters of solution containing 1.0 mole of uranyl nitrate; 2.0–2.5 moles of NH$_4$NO$_3$;
0.5–1.0 mole of HNO$_3$; and components in column 1. Charged to 14-liter autoclave at 20
to 30° C. with 1 atm air and 45 psi of Ar added.

| Column: 1 | 2 | 3 | 4 | 5 | 6 | 7 | 8 | 9 | 10 | 11 | 12 |
|---|---|---|---|---|---|---|---|---|---|---|---|
| Additional feed components | | Solution pH | | Product solution | | | Gas Formed | | Temperature for start of Reaction (°C.) | | |
| Compound | Moles | Feed | Product | Moles U | Moles nitrate and nitrite | Moles NH$_4^+$ | Moles total | Maximum rate (moles/min) | From TR$^a$ | From PR-P(H$_2$O) | Run No. |
| n-propanol | 2.0 | 0.73 | 3.18 | 0.3 | 0.10 | 0.04 | 4.9 | 0.5 | 106 | 110 | C11 |
| n-propanol$^b$ | 1.5 | 0.6 | 2.86 | 0.30 | 0.14 | 0.07 | 4.0 | 0.3 | 114 | 116 | C12 |
| Acetic acid | 2.0 | 0.89 | 0.78 | 1.97 | | | 1.7 | 0.01 | No reaction to 246° C. | | C15 |
| Methyl alcohol | 5.0 | 0.62 | 4.31 | 0.026 | <0.01 | <0.01 | 8.2 | | 140 | 195 | C16 |
| | | | | | | | | 4.0 | 204 | 204 | |
| Methyl alcohol Nitromethane | 5.0 2.0 | 0.7 | 1.46 | 2.0 | | | 1.6 | 0.01 | N.D. | 196 | C20 |
| Methyl alcohol | 5.0 | 0.7 | 3.06 | 0.27 | 0.054 | 0.02 | 9.3 | 5. | 112 | 105 | C27 |

$^a$N.D. indicates not detectable; that is, change in slope was too small to see.
$^b$Charge for C12 was C11 solution product plus 1.0 mole UO$_2$(NO$_3$)$_2$, 1.0 mole NH$_4$NO$_3$, and 1.0 mole HNO$_3$.

The precipitate formed in Run C27 was recovered by filtration and dried by contacting with air at 25° C. The resulting powder was fine and free-flowing, having a gray-green color and a bulk density of 1.65 g/cm$^3$. As determined by microphotography, the powder consisted of large agglomerates whose largest dimension typically was in the range of 0.1–0.5µ. The BET (N$_2$-adsorption) surface area of the powder was 1.7 m$^2$g. X-ray diffraction measurements showed the oxide to be 70–90% UO$_3$.H$_2$O; some unidentified lines were present. The carbon content of the oxide was about 1.7%, as measured by wet chemical analyses. Most of this was probably formate, which would be removable by a low-temperature calcination. A low carbon content is desirable to meet specifications for the fabrication of fuel-metal oxide into pellets.

As mentioned, nearly complete decomposition of the nitrates in the solution was achieved in Run C27. Although the actual mechanisms are probably complex chain reactions involving the nitromethane and H$^+$ (or H$_3$O$^+$) from HNO$_3$, the overall (net) effects can be represented by the following equations:

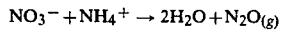

$$NO_3^- + NH_4^+ \rightarrow 2H_2O + N_2O_{(g)}$$

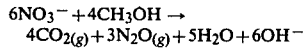

$$6NO_3^- + 4CH_3OH \rightarrow$$
$$4CO_{2(g)} + 3N_2O_{(g)} + 5H_2O + 6OH^-$$

tion temperatures approximating the temperature in C27; however, C11 and C12 did not produce as high a degree of uranium precipitation and their product oxides contained appreciably more carbon. It is likely that n-propanol forms a somewhat less desirable residue of complex organic compounds than does methyl alcohol. As shown, the run (C15) made with acetic acid gave no reaction to 246° C. Run 16, conducted with methyl alcohol and nitric acid but without nitromethane, gave a good decomposition of nitrate and good precipitation of uranium; however, much of the reaction occurred at undesirably high temperatures (204° to 210° C.). As listed in Table 2, both the temperature-recorder chart and the pressure-recorder chart showed two periods of reaction for Run 16. The dried solids from this run consisted mainly of about equal amounts of UO$_2$(OH)$_2$ and UO$_2$(HCOO)$_2$.H$_2$O. The basic particle was a thin leaf as large as 200 microns by 200 microns, with a BET surface area of about 0.5 m$^2$g. Another run (C20), made with methyl alcohol and nitric acid but without nitromethane, gave much less reaction and no significant precipitation of uranium.

Figure 4:
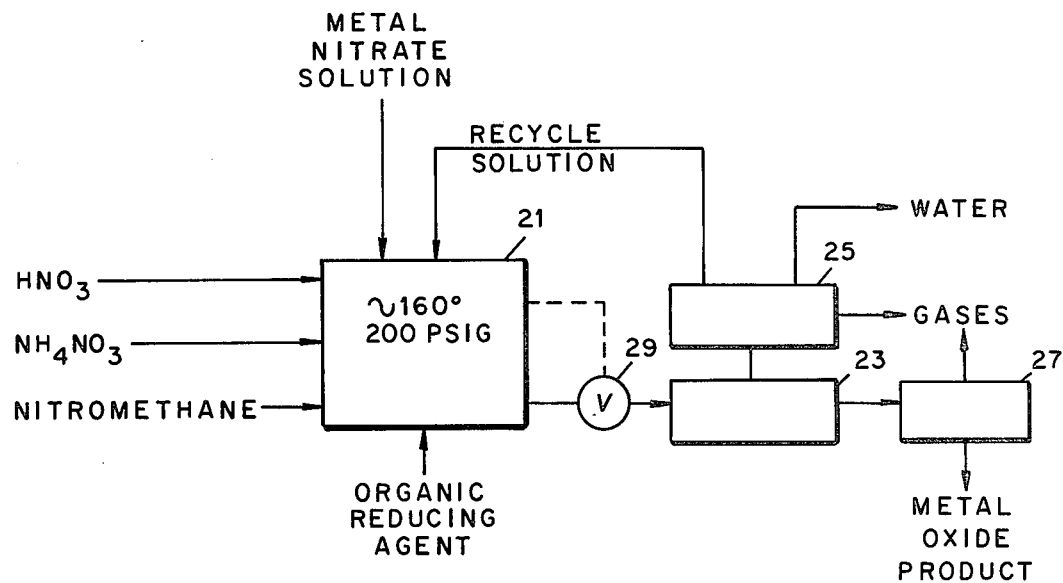
FIG. 4 is a schematic diagram for continuously converting uranyl nitrate to uranium oxide in accordance with the invention.

It will be apparent from the foregoing that this invention can be utilized in a system for continuously decomposing weak-base metal nitrates. For example, it can be used on a continuous basis to decompose a nuclear-fuel metal nitrate and convert the same to fuel-metal oxide. FIG. 4 is a schematic diagram of one form of continuous system for this purpose. The system may consist throughout of conventional components composed of off-the-shelf stainless steel. The system includes a high-pressure reactor 21 for receiving separate streams of the following: $HNO_3$; $NH_4NO_3$; nuclear-fuel metal nitrate aqueous solution; $CH_3NO_2$; and any suitable organic reducing agent for the metal nitrate (see U.S. Pat. No. 3,275,293). The reducing agent may, for example, be n-propanol, ethanol, sugar, ethylene, glycol, or methanol. The reactor is provided with an automatic pressure-relief valve 29 for venting gases and precipitated oxide-containing solution as required to maintain the reactor at a selected moderate pressure (e.g., 200 psig) corresponding to a moderate temperature (e.g., 160° C.) at which the nitrate-decomposition rate is relatively high. The operating temperature may, for example, be in the range of from about 130°–200° C. The output from the valve is fed to any suitable means for separating the solids, which in turn are fed to means 27 for drying the metal-oxide product. The vapor output from the separator 23 is fed to distillation means 25 whose output vapor is condensed and discharged. The concentrated solution from the distillation step is recycled to the reactor 21.

The foregoing examples are specific illustrations of how this invention may be used to advantage in the decomposition of $NH_4NO_3$ and/or metal nitrates in pressurized, heated aqueous solution. That is, they are illustrations of how my discovery may be utilized to significantly lower threshold decomposition temperatures, thus permitting a considerable reduction in operating temperature and pressure at useful rates of decomposition. It will be understood that the amounts of nitromethane and nitric acid cited in Runs C25, C26, and C27 are not necessarily the optimum and that the most effective amounts thereof may vary with the particular use contemplated. Given the teachings herein, one versed in the art can determine by merely routine testing the suitable process parameters for a given application of the invention and whether a candidate metal nitrate satisfies the criteria specified herein. It is within the scope of the invention as set forth in the appended claims to process aqueous solutions which as received contain not only $NH_4NO_3$ and/or a weak-base metal nitrate but also some nitric acid. In such applications, nitromethane is added to the solution, together with any additional nitric acid required to provide an effective amount of these components.

What is claimed is:

1. In a process for decomposing, in an aqueous solution maintained at elevated temperature and pressure, a nitrate compound selected from the group consisting of ammonium nitrate and nuclear-fuel metal nitrates, said solution also containing a hydroxylated, organic, nitrate-reducing agent where said compound is a nuclear-fuel metal nitrate, the improvement comprising:
   incorporating in said solution an effective proportion of both nitromethane and nitric acid to accelerate decomposition of said compound.

2. The process of claim 1 wherein said temperature is maintained in the range of from about 130° to 200° C.

3. The process of claim 2 wherein said process is conducted in a reactor from which gaseous products are vented as required to maintain said temperature in said range.

4. A process for the decomposition of ammonium nitrate, comprising:
   maintaining an aqueous solution of ammonium nitrate at elevated temperature and pressure, said solution also containing an effective proportion of both nitromethane and nitric acid to accelerate decomposition of said ammonium nitrate.

5. A process for for decomposing ammonium nitrate in aqueous solution, said process comprising:
   maintaining an aqueous solution containing ammonium nitrate, nitromethane, and nitric acid at elevated temperature and pressure in a reaction zone, said nitromethane and nitric acid being present in an effective proportion to lower the threshold temperature for the decomposition of ammonium nitrate in said solution below the threshold temperature obtaining at the same temperature and pressure in the absence of said nitromethane and nitric acid.

6. The process of claim 5 further characterized by the step of maintaining the gas pressure in said zone at a preselected value by venting fluid decomposition products therefrom.

7. The process of claim 6 wherein said zone is maintained at a temperature in the range of from about 130° to 200° C.

8. In a process for decomposing a metal nitrate in a pressurized, heated aqueous solution also containing a hydroxylated, organic, nitrate-reducing agent, said metal being one which hydrolyzes or precipitates in said solution to remove $OH^-$ therefrom, the improvement comprising:
   incorporating in said solution an effective proportion of both nitromethane and nitric acid to accelerate decomposition of said metal nitrate.

9. The process of claim 8 wherein said metal nitrate is a nuclear-fuel metal nitrate.

10. The process of claim 8 wherein said solution is maintained at a temperature in the range of from about 130° to 200° C.

* * * * *